United States Patent
Hanya

(10) Patent No.: US 6,883,572 B2
(45) Date of Patent: Apr. 26, 2005

(54) **PNEUMATIC RADIAL TIRE WITH INNER CARCASS PLY E*1 DIFFERENT FROM OUTER CARCASS PLY E*2**

(75) Inventor: Masahiro Hanya, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 10/736,674

(22) Filed: Dec. 17, 2003

(65) Prior Publication Data

US 2004/0123931 A1 Jul. 1, 2004

(30) Foreign Application Priority Data

Dec. 24, 2002 (JP) .......................... 2002-372558

(51) Int. Cl.$^7$ ................ B60C 9/08; B60C 9/04
(52) U.S. Cl. ............................................. 152/564
(58) Field of Search ............................ 152/564

(56) References Cited

U.S. PATENT DOCUMENTS 5,522,443 A 6/1996 Ueyoko et al.
6,814,118 B1 * 11/2004 Narahara et al. ....... 152/564 X

FOREIGN PATENT DOCUMENTS

| EP | 0 686 514 A2 | 12/1995 |
| EP | 1 195 270 A2 | 4/2002 |
| JP | 8-53003 A | 2/1996 |
| JP | 8-72503 A | 3/1996 |
| JP | 8-108704 A | 4/1996 |
| JP | 8-164707 A | 6/1996 |
| JP | 08 164707 A | 6/1996 |

* cited by examiner

Primary Examiner—Adrienne C. Johnstone
(74) Attorney, Agent, or Firm—Birch, Stewart, Kolasch & Birch, LLP

(57) ABSTRACT

A pneumatic radial tire has a carcass composed of radially inner and outer carcass plies. A complex elastic modulus E*1 of the topping rubber of the inner carcass ply is different from a complex elastic modulus E*2 of the topping rubber of the outer carcass ply, and a ratio E*1/E*2 is 0.95 or lower or 1.05 or higher.

3 Claims, 4 Drawing Sheets

PNEUMATIC RADIAL TIRE WITH INNER CARCASS PLY E*1 DIFFERENT FROM OUTER CARCASS PLY E*2

BACKGROUND OF THE INVENTION

1. Technical Field

The present invention relates to a pneumatic tire in which both steering stability and road noise-reducing ability are enhanced.

2. Background Technique

Conventionally, in order to enhance noise-reducing ability, especially road noise-reducing ability of a tire, a material having low rigidity is used for a carcass cord constituting a carcass, or the strike number per unit width of the cord is reduced to reduce the rigidity of the tier, thereby restraining noise and vibration from generating. This is because that if the rigidity of the tire is low, input from a road surface can be moderated, and vibration of a tread portion itself transmitted to the road surface can be reduced.

However, in this conventional method, although the road noise-reducing ability is enhanced by reducing the rigidity of the tire, there is a problem that the steering stability is deteriorated. The road noise-reducing ability and the steering stability are in an antinomic relation, and it is extremely difficult to enhance both of them to high level.

In view of the above circumstances, the present inventors researched and as a result, the inventor found that there exists a range where both the steering stability and the road noise-reducing ability can be enhanced by 1) forming a carcass of two carcass plies,
2) differentiating complex elastic moduli of topping rubbers used for the carcass plies from each other, and
3) limiting relative ratio of the complex elastic moduli.

Each of the following patent documents 1 to 4 proposes a technique for enhancing the road noise-reducing ability while keeping the steering stability by differentiating thermal shrinkage ratio, intermediate elongation, nenier number (cord thickness) or strike number of carcass cords of two carcass plies in a tire having the two carcass plies.

[Patent document 1]
Japanese Patent Application Laid-open No. H8-53003
[Patent document 2]
Japanese Patent Application Laid-open No. H8-164707
[Patent document 3]
Japanese Patent Application Laid-open No. H8-72503
[Patent document 4]
Japanese Patent Application Laid-open No. H8-108704

Based on an idea that a carcass is formed of two carcass plies and complex elastic moduli of topping rubbers of the carcass plies are differentiated with a predetermined ratio, it is an object of the present invention to easily provide a pneumatic radial tire capable of enhancing the steering stability and the road noise-reducing ability without deteriorating uniformity.

To achieve the above object, the present invention provides a pneumatic radial tire having a carcass including radially inner and outer carcass plies each having a ply body extending from a tread portion to a bead core of a bead portion through a sidewall portion, wherein each of the inner and outer carcass plies includes a cord-arrangement body in which carcass cords are aligned to each other, front and back surfaces of the cord-arrangement body are coated with topping rubber, a complex elastic modulus $E^*1$ of the topping rubber of the inner carcass ply is different from a complex elastic modulus $E^*2$ of the topping rubber of the outer carcass ply, and a ratio $E^*1/E^*2$ is 0.95 or lower or 1.05 or higher.

It is preferable that the ratio $E^*1/E^*2$ is 0.8 to 0.95 or 1.05 to 1.3. It is also preferable that lower one of the complex elastic moduli $E^*1$ and $E^*2$ is in a range of 4.0 to 5.0 Mpa.

DISCRIPTION OF THE PREFERRED EMBODIMENTS

Figure 1:
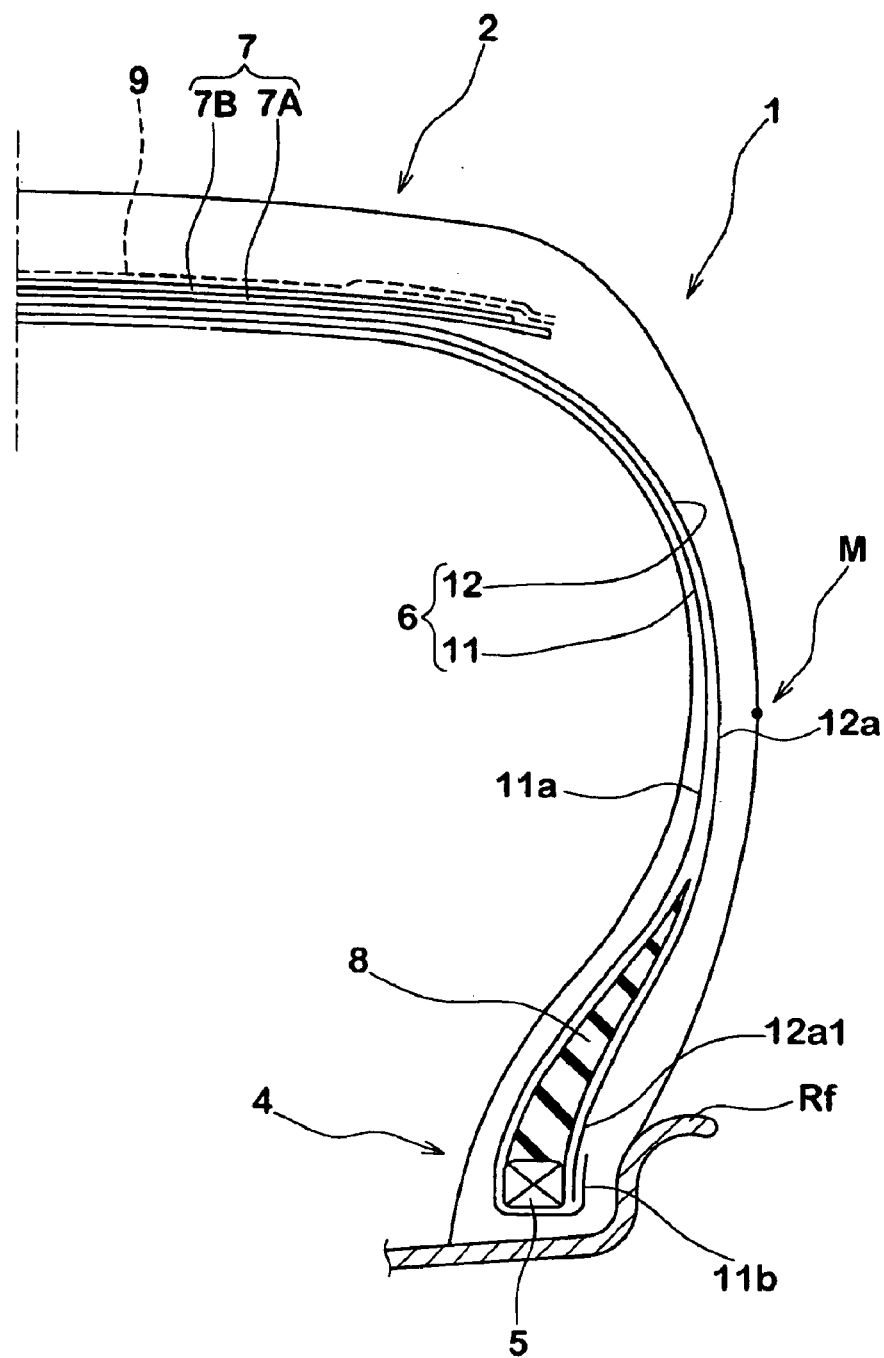
FIG. 1 is a sectional view showing one exemplary embodiment of a pneumatic tire of the present invention.

An exemplary embodiment of the invention will be explained based on the drawings below. FIG. 1 is a sectional view showing a pneumatic radial tire for a passenger car according to the invention.

In FIG. 1, a pneumatic radial tire 1 includes a carcass 6 extending from a tread portion 2 to a bead core 5 of a bead portion 4 through a sidewall portion 3, and a belt layer 7 disposed inside the tread portion 2 and radially outside of the carcass 6.

A bead apex rubber 8 having a triangular cross section extending from the bead core 5 radially outward is disposed in the bead portion 4. The bead apex rubber 8 reinforces a portion of the pneumatic radial tire 1 from the bead portion 4 to the sidewall portion 3.

The belt layer 7 is formed of two or more (two in this example) belt plies 7A and 7B in which belt cords are arranged at an angle of 10 to 35° with respect to a circumferential direction of the tire. Since the belt cords intersect with each other between the plies, the belt rigidity of the belt layer 7 is enhanced, and substantially the entire width of the tread portion 2 is strongly reinforced with hoop effect. A steel cord is employed as the belt cord in this example, but organic fiber cord having high modulus such as polyethylene naphthalate (PEN), polyethylene terephthalate (PET) and aromatic polyamide can also be used if necessary.

A band layer 9 may be provided radially outside of the belt layer 7 for enhancing high speed resistance. In the band layer 9, band cords of organic fiber such as nylon are arranged with respect to the circumferential direction of the tire at an angle of 5° or less. As the band layer 9, a pair of left and right edge band plies for covering only outer end of the belt layer 7 in the axial direction of the tire, or a full band ply for covering substantially the entire width of the belt layer 7 may be used. In this example, the band layer 9 has the pair of edge band plies and one full band ply.

Next, the carcass 6 is formed of two carcass plies 11 and 12 disposed radially inside and outside. In this example, the carcass 6 has 1-1 structure in which the inner carcass ply 11 is a so-called winding-up ply, and the outer carcass ply 12 is a so-called winding-down ply.

More specifically, the inner carcass ply 11 comprises a ply body 11a which passes an inner side surface of the bead apex rubber 8 in the axial direction of the tire and is astride the bead cores 5 and 5, and a ply winding-up portion 11b which is wound up from inner side to outer side in the axial direction of the tire around the bead core 5 and is retained. In this example, the ply winding-up portion 11b is terminated at a position radially inner side than a tip end of a rim flange Rf, but the ply winding-up portion 11b may be terminated at a height region between the tip end of the rim flange Rf and a maximum width position M of the tire, or may extend to a height region exceeding the maximum width position M of the tire radially outward.

The outer carcass ply 12 comprises a ply body 12a which passes an outer side surface of the bead apex rubber 8 in the axial direction of the tire and is astride between the bead cores 5 and 5. Opposite ends 12a1 of the ply body 12a are wound downward around the bead core 5 and are terminated without being wound upward. In this example, the opposite ends 12a1 are sandwiched between the ply winding-up portion 11b and the bead core 5, but it may be wound downward along an outer side surface of the ply winding-up portion 11b.

Figure 2:
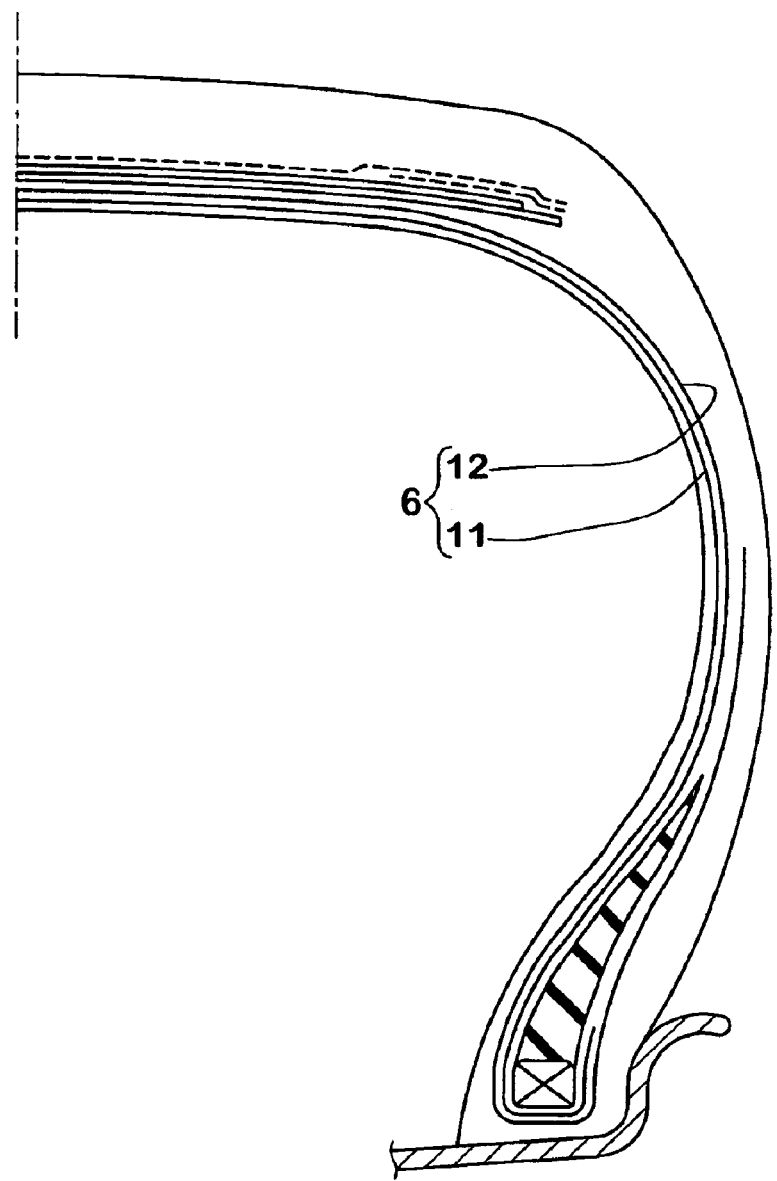
FIG. 2 is a sectional view showing another structure of a carcass.

As the carcass 6, it is also possible to employ a 2-0 structure in which the outer carcass ply 12 is formed of the winding-up ply as shown in FIG. 2 instead of the 1-1 structure.

Figure 3:
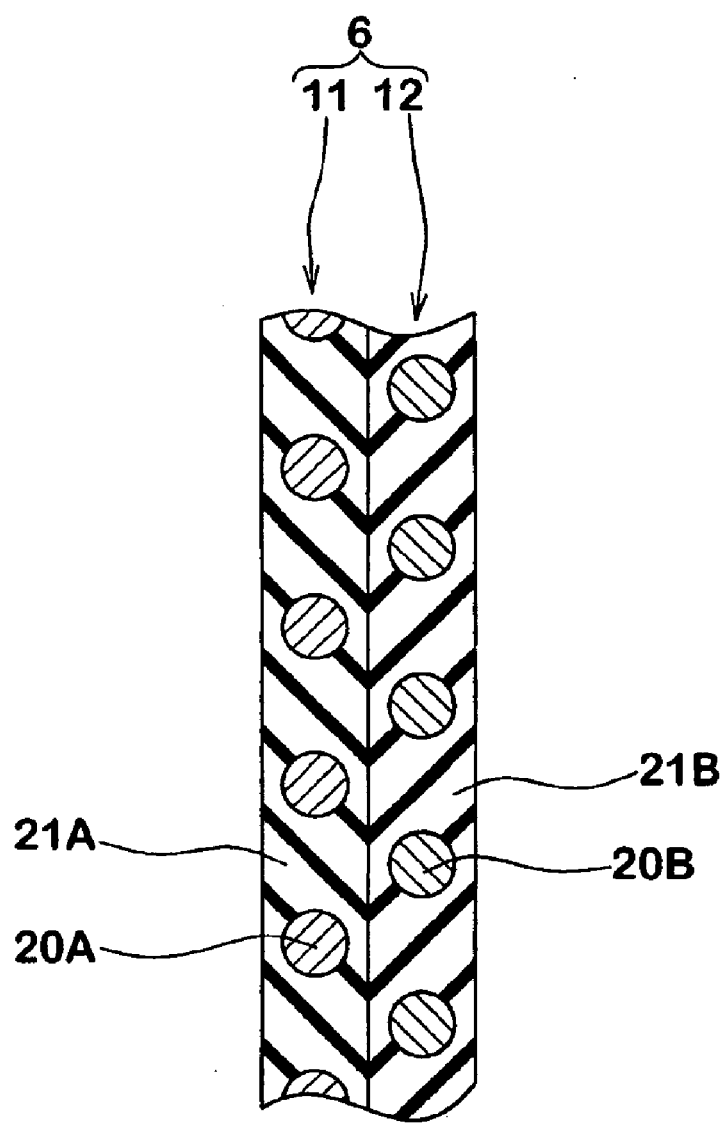
FIG. 3 is a sectional view for explaining carcass plies.

As shown in FIG. 3, the inner and outer carcass plies 11 and 12 are formed of sheet bodies in which front and back surfaces of cord-arrangement bodies having carcass cords 20A and 20B arranged at an angle of 70 to 90° with respect to the circumferential direction of the tire are covered with topping rubbers 21A and 21B.

At that time, in the inner and outer carcass plies 11 and 12, the same cords having substantially the same cord materials, twisted structures and cord thicknesses are employed as the carcass cords 20A and 20B, and their strike number is also set equally. As a material of the cords, it is possible to employ organic fiber such as nylon, polyester, rayon, vinylon, aromatic polyamide fiber. The cord thickness is preferably in a range of 1000 dtex to 2000 dtex, and the cord strike number per a width of 5 cm in a direction perpendicular to the carcass cord is preferably in a range of 40 to 65.

Whereas, in the topping rubber 21A of the inner carcass ply 11 and the topping rubber 21B of the outer carcass ply 12, the complex elastic moduli $E^*1$ and $E^*2$ are differentiated from each other, and a ratio of the complex elastic moduli $E^*1/E^*2$ is set to 0.95 or lower or 1.05 or higher.

In this invention, since the complex elastic moduli $E^*1$ and $E^*2$ of the topping rubbers 21A and 21B are differentiated from each other, it is possible to enhance both the steering stability and the road noise-reducing ability. It is considered that the reason thereof is as follows: That is, not only the rigidity in the radial direction of the tire but also the rigidity in the circumferential direction and the twisting rigidity are enhanced with well balance by the topping rubber having higher complex elastic modulus, and vibration transmitting characteristics from the tread portion 2 toward the rim in the radial direction is restrained from increasing, and the steering stability can be enhanced effectively. The topping rubber having lower complex elastic modulus exhibits vibration-restraining function, and further suppresses the vibration transmitting characteristics, and it is possible to enhance the road noise-reducing ability. This also enhance the riding comfort.

If the $E^*1/E^*2$ becomes greater than 0.95 or smaller than 1.05 and becomes close to 1.0, a difference between the complex elastic moduli $E^*1$ and $E^*2$ becomes excessively small, and the enhancing effect (effect of the present invention) of the steering stability and the road noise-reducing ability can not be exhibited. If the $E^*1/E^*2$ becomes smaller than 0.80 or greater than 1.30 also, the difference between the complex elastic moduli $E^*1$ and $E^*2$ becomes excessively great and the effect of the present invention is deteriorated. Therefore, the $E^*1/E^*2$ is preferably in a range of 0.8 to 0.95 or 1.05 to 1.3, and more preferably in a range of 0.8 to 0.90 or 1.10 to 1.3.

These effects can also be confirmed by a test result carried out by the present inventor (shown in FIG. 4) Details of the test will be explained in the following "Embodiment".

In this invention, in order to enhance both the steering stability and the road noise-reducing ability, it is preferable that the lower one of the complex elastic moduli $E^*1$ and $E^*2$ is set in a range of 4.0 to 5.0 Mpa. If the value exceeds this range, one of the steering stability and the road noise-reducing ability is not sufficient and it becomes difficult to enhance them at high level. The complex elastic moduli $E^*1$ and $E^*2$ were measured using a viscoelastic spectrometer produced by Iwamoto Seisakusho K.K. under conditions of temperature of 70° C., frequency of 10 Hz and dynamic distortion ratio of 2%.

Although especially preferable exemplary embodiment of the present invention has been described above, the invention can also be employed in tires of various categories such as tires for commercial vehicle, small truck, motorcycle and the like, and the invention should not limited to the illustrated exemplary embodiment and various modifications may be made.

[Embodiments]

Radial tires for a passenger car having the structure shown in FIG. 1 and size of 205/55R16 were prototyped based on the specification shown in Table 1, and steering stability, riding comfort and road noise-reducing ability were tested and compared. In the tires, conditions other than the specification shown in Table 1 were the same.

Details of the belt layer are as follows: the number of plies is 2, belt cord is steel cord, cord angle is 22° and the cord strike number is 40/5 cm.

(1) Steering Stability and Riding Comfort:

The prototyped tires were mounted to all wheels of a vehicle (2000 cc, FF vehicle) under conditions of rim (16×6.5 JJ) and internal pressure (220 kPa), the vehicle was allow to run on a test course, and the steering stability and the riding comfort were evaluated according to a ten-point method by a driver's sensory evaluation while a conventional example is designated as 6. A greater numeric value indicates more excellent result.

Figure 4:
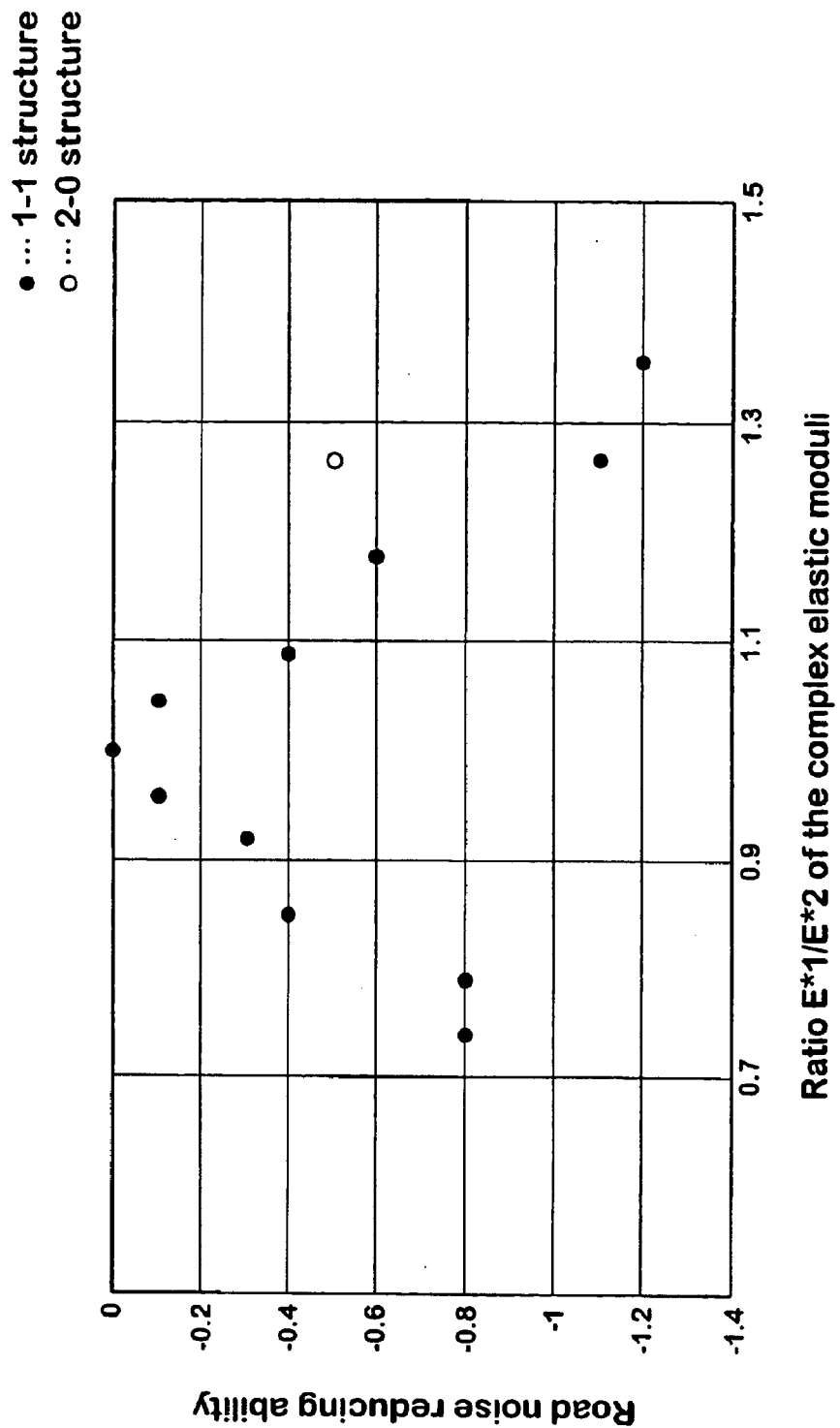
FIG. 4 is a graph showing a relation between a ratio $E^*1/E^*2$ of complex elastic modulus and road noise.

(2) Road Noise-reducing Ability:

The above vehicle was allowed to run on a asphalt road surface at speed of 50 km/h, noise level dB(A) was measured at a left ear position at a driver's seat, and a noise difference based on the conventional example as a reference. Here, − (minus) means that the noise level is low and excellent. FIG. 4 shows a relation between the ratio $E^*1/E^*2$ of the complex elastic moduli and the road noise as a graph.

TABLE 1

| | Conventional example | Embodiment 1 | Embodiment 2 | Embodiment 3 | Embodiment 4 | Embodiment 5 | Embodiment 6 | Embodiment 7 | Embodiment 8 | Embodiment 9 | Comparative example 1 | Comparative example 2 |
|---|---|---|---|---|---|---|---|---|---|---|---|---|
| Carcass structure | | | | | 1-1 structure | | | | | 2-0 structure | 1-1 structure | |
| Inner carcass ply | | | | | | Winding-up ply | | | | | | |
| Cord material | | | | | | Polyester | | | | | | |
| Cord thickness | | | | | | 1000 dtex | | | | | | |
| Cord angle | | | | | | 88 to 90° (finished) | | | | | | |
| Cord strike number | | | | | | 50 | | | | | | |
| Complex elastic modulus E*1 Mpa | 45 | 49 | 53 | 57 | 61 | 45 | 45 | 45 | 45 | 57 | 47 | 45 |
| Outer carcass ply | | | | | | Winding-down ply | | | | | | |
| Cord material | | | | | | Polyester | | | | | | |
| Cord thickness | | | | | | 1000 dtex | | | | | | |
| Cord angle | | | | | | 88 to 90° (finished) | | | | | | |
| Cord strike number | | | | | | 50 | | | | | | |
| Complex elastic modulus E*2 Mpa | 45 | 45 | 45 | 45 | 45 | 49 | 53 | 57 | 61 | 45 | 45 | 47 |
| Ratio E*1/E*2 | 1 | 1.09 | 1.18 | 1.27 | 1.36 | 0.92 | 0.85 | 0.79 | 0.74 | 1.27 | 1.04 | 0.96 |
| Steering stability | 6 | 7 | 7 | 8 | 8 | 6 | 7 | 7 | 7 | 7 | 6 | 6 |
| Riding comfort | 6 | 6 | 6 | 7 | 7 | 6 | 6 | 7 | 7 | 7 | 6 | 6 |
| Road noise-reducing ability | 0 | −0.4 | −0.6 | −1.1 | −1.2 | −0.3 | −0.4 | −0.8 | −0.8 | −0.5 | −0.1 | −0.1 |

As explained above, since the carcass is formed of two carcass plies, complex elastic moduli of topping rubbers of the carcass plies are differentiated with a predetermined ratio, it is possible to easily provide a pneumatic radial tire capable of enhancing the steering stability and the road noise-reducing ability without deteriorating uniformity.

What is claimed is:

1. A pneumatic radial tire having a carcass including radially inner and outer carcass plies each having a ply body extending from a tread portion to a bead core of a bead portion through a sidewall portion, wherein
    each of the inner and outer carcass plies includes a cord-arrangement body in which carcass cords are aligned to each other, front and back surfaces of the cord-arrangement body are coated with topping rubber, a complex elastic modulus $E*1$ of the topping rubber of the inner carcass ply is different from a complex elastic modulus $E*2$ of the topping rubber of the outer carcass ply, and a ratio $E*1/E*2$ is 0.95 or lower or 1.05 or higher.

2. The pneumatic radial tire according to claim 1, wherein the ratio $E*1/E*2$ is 0.8 to 0.95 or 1.05 to 1.3.

3. The pneumatic radial tire according to claim 1 or 2, wherein lower one of the complex elastic moduli $E*1$ and $E*2$ is in a range of 4.0 to 5.0 Mpa.

* * * * *